US009725914B2

(12) United States Patent
Strickland

(10) Patent No.: US 9,725,914 B2
(45) Date of Patent: Aug. 8, 2017

(54) INSTALLATION ASSIST AND METHOD

(71) Applicant: Michael Wayne Strickland, Dayton, TX (US)

(72) Inventor: Michael Wayne Strickland, Dayton, TX (US)

( * ) Notice: Subject to any disclaimer, the term of this patent is extended or adjusted under 35 U.S.C. 154(b) by 0 days.

(21) Appl. No.: 14/714,159

(22) Filed: May 15, 2015

(65) Prior Publication Data

US 2015/0259930 A1 Sep. 17, 2015

Related U.S. Application Data

(63) Continuation-in-part of application No. 29/421,602, filed on Aug. 21, 2012, now abandoned.

(51) Int. Cl.

*B23Q 3/00* (2006.01)
*E04F 21/18* (2006.01)
*B25B 3/00* (2006.01)
*B25B 5/08* (2006.01)
*B25B 5/06* (2006.01)
*B25B 5/12* (2006.01)

(52) U.S. Cl.

CPC ............ *E04F 21/1844* (2013.01); *B25B 3/00* (2013.01); *B25B 5/067* (2013.01); *B25B 5/082* (2013.01); *B25B 5/125* (2013.01)

(58) Field of Classification Search

USPC .... 269/309, 6, 3, 95, 166–168; 29/261, 266, 29/280

See application file for complete search history.

(56) References Cited

U.S. PATENT DOCUMENTS

| | | | | | |
|---|---|---|---|---|---|
| 848,036 | A | * | 3/1907 | Kruger | B25B 5/003 269/156 |
| 1,674,669 | A | * | 6/1928 | Stedman | B23Q 11/0017 144/104 |
| 1,982,957 | A | * | 12/1934 | Knell | H02G 3/126 180/68.5 |
| 2,440,820 | A | * | 5/1948 | Frank | B25B 5/101 269/154 |
| 2,648,073 | A | * | 8/1953 | Nowell | A47C 19/005 280/35 |
| 3,770,259 | A | * | 11/1973 | Wagreich | B25B 11/007 248/362 |
| 4,449,338 | A | | 5/1984 | Reicherts | |
| 4,463,923 | A | * | 8/1984 | Reiker | E04B 9/006 248/27.1 |
| 4,709,460 | A | | 12/1987 | Luhowyj | |
| 4,709,527 | A | | 12/1987 | Cooley | |
| D298,209 | S | * | 10/1988 | Hoke | D8/72 |
| 4,909,405 | A | * | 3/1990 | Kerr, Jr. | H02G 3/125 220/3.2 |
| 5,303,894 | A | * | 4/1994 | Deschamps | H02G 3/125 248/343 |

(Continued)

*Primary Examiner* — Larry E Waggle, Jr.
*Assistant Examiner* — Alvin Grant
(74) *Attorney, Agent, or Firm* — Buche & Associates, P.C.; John K. Buche; Scott D. Compton

(57) ABSTRACT

The application is directed to a device for assisting individuals with the installation of one or more construction materials. The device is operationally configured to support construction materials at an elevated position. The device is also operationally configured to be attached to horizontal surfaces, vertical surfaces and angled surfaces.

10 Claims, 6 Drawing Sheets

(56) References Cited

U.S. PATENT DOCUMENTS

| | | | | | | |
|---|---|---|---|---|---|---|
| 5,330,216 | A | * | 7/1994 | Schnell | B25B 5/003 | 269/148 |
| 5,371,994 | A | | 12/1994 | Waters | | |
| 5,393,026 | A | * | 2/1995 | Deschamps | H02G 3/125 | 248/343 |
| 5,678,799 | A | * | 10/1997 | Jorgensen | F21V 21/03 | 248/200.1 |
| 6,101,702 | A | * | 8/2000 | Claycomb | B25B 11/007 | 254/95 |
| 6,131,361 | A | | 10/2000 | Murphy | | |
| 6,293,058 | B1 | * | 9/2001 | Sink | E04F 21/00 | 242/129 |
| 6,321,878 | B1 | * | 11/2001 | Mobley | A61G 7/00 | 188/1.12 |
| 6,461,016 | B1 | * | 10/2002 | Jamison | F21S 8/02 | 362/147 |
| 6,467,236 | B1 | | 10/2002 | Schlegel | | |
| 6,637,363 | B2 | * | 10/2003 | Schmitt | B63B 19/02 | 114/343 |
| 6,904,732 | B1 | * | 6/2005 | Richmond | E04F 21/185 | 52/127.1 |
| 6,957,515 | B1 | * | 10/2005 | Hatfield | E04F 21/18 | 248/354.3 |
| 7,429,025 | B1 | * | 9/2008 | Gretz | H02G 3/20 | 248/200.1 |
| 7,621,493 | B2 | * | 11/2009 | Vermette | B60R 9/06 | 224/500 |
| 7,631,462 | B1 | * | 12/2009 | Rios | E04F 21/185 | 52/127.2 |
| 8,622,361 | B2 | * | 1/2014 | Wronski | F21V 21/048 | 248/200.1 |
| 9,004,421 | B2 | * | 4/2015 | Feenstra | A62C 35/68 | 248/200.1 |
| 9,004,422 | B2 | * | 4/2015 | Feenstra | A62C 35/68 | 248/200.1 |
| 2004/0035998 | A1 | * | 2/2004 | McCoy | B60R 9/06 | 248/351 |
| 2006/0192067 | A1 | * | 8/2006 | Oh | A62C 35/68 | 248/342 |
| 2007/0012847 | A1 | * | 1/2007 | Tai | E04B 9/006 | 248/343 |
| 2007/0063121 | A1 | * | 3/2007 | Oh | A62C 35/68 | 248/342 |
| 2007/0295138 | A1 | * | 12/2007 | Wang | B23Q 1/58 | 74/490.07 |
| 2011/0155865 | A1 | * | 6/2011 | Oh | A62C 35/68 | 248/67.7 |
| 2011/0284098 | A1 | * | 11/2011 | Silcox | A62C 35/68 | 137/15.18 |
| 2012/0006140 | A1 | * | 1/2012 | Wang | G05G 11/00 | 74/490.07 |
| 2013/0140750 | A1 | * | 6/2013 | Allred, III | B25B 5/067 | 269/249 |
| 2013/0161462 | A1 | * | 6/2013 | Haddock | F16M 13/02 | 248/237 |

* cited by examiner

INSTALLATION ASSIST AND METHOD

CROSS-REFERENCE TO RELATED APPLICATIONS

This application is a continuation-in-part of U.S. design patent application Ser. No. 29/421,602, filed Aug. 8, 2012, which is incorporated herein by reference.

STATEMENT REGARDING FEDERALLY SPONSORED RESEARCH OR DEVELOPMENT

Not applicable.

FIELD OF THE APPLICATION

This application relates generally to an installation aid for construction materials including, but not necessarily limited to drywall, plywood, lumber, pipe, cable, glass, tile, paneling, and the like.

BACKGROUND OF THE APPLICATION

It is often difficult in construction settings for a single individual to hold construction materials up off of flooring, e.g., overhead, before and during installation of the construction materials. In common practice, two or more individuals are employed to hold and/or balance construction items, or part thereof, up off of flooring during installation of such items. There is a need for an assist that allows a single individual the ability to accomplish such tasks alone.

SUMMARY

The application is directed to an assist for installing construction materials apart from architectural flooring including (a) a support member defined by a longitudinal axis; and (b) a mounting assembly attached at each end of the support member, each mounting assembly being operationally configured to be releasably attached to horizontal, vertical, and angled surfaces of architectural surface structures.

The application is also directed to a construction materials installation assist including (a) a support member adjustable in length and (b) a mounting assembly attached at each of the distal ends of the support member, each mounting assembly being adjustable in a manner effective for securing an end of the assist to horizontal surfaces, vertical surfaces and angled surfaces.

DETAILED DESCRIPTION

Figure 1:
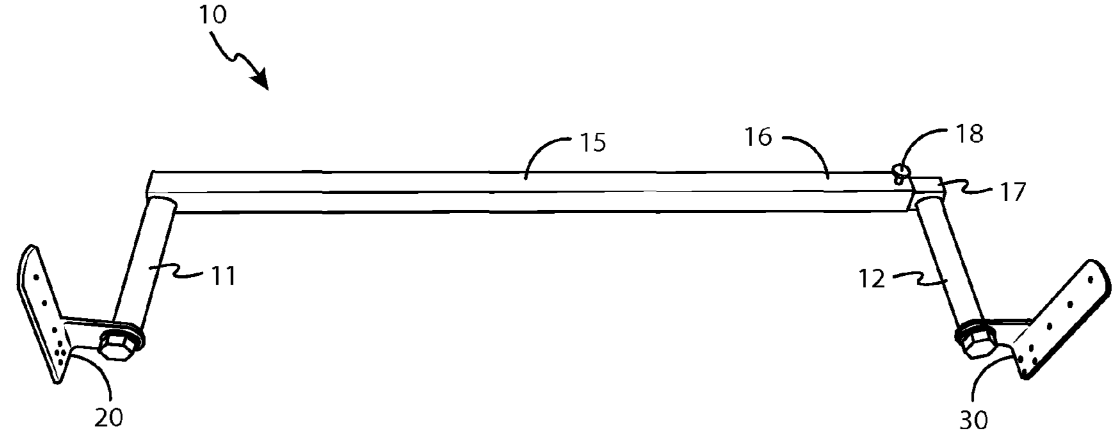
FIG. 1 is a perspective view of an embodiment of an assist of this application.

Before describing the invention in detail, it is to be understood that the present assembly, system and method are not limited to particular embodiments. It is also to be understood that the terminology used herein is for the purpose of describing particular embodiments only and is not intended to be limiting. As used in this specification and the appended claims, the term "drywall" refers to a panel made of gypsum plaster pressed between two thick sheets of paper and is used to make interior walls and ceilings. Drywall is also known by names such as plasterboard, wallboard, and gypsum board. Herein, the terms "ground," "floor," "flooring," "deck," and the like, may be used interchangeably to describe a surface common to most architectural type structures and other surfaces traveled upon by individuals. The phrase "architectural surface structures" may refer to building materials typical to construction as understood by persons of ordinary skill in the art. For the purposes of this application, architectural surfaces may be provided as horizontal surfaces disposed substantially perpendicular to the vector of gravity, vertical surfaces disposed substantially parallel to the vector of gravity and angled surfaces in relation to the vector of gravity.

In one aspect, the application provides a device operationally configured so that a single individual may install construction materials off of flooring and/or in an overhead position.

In another aspect, the application provides a device effective to support one or more construction materials at an elevated position apart from the ground or surface regardless of what may or may not be located on the ground or surface below the elevated installation location of the one or more construction materials.

In another aspect, the application provides an adjustable device for assisting one or more individuals with installing construction materials at an elevated location.

In another aspect, the application provides an installation assist including opposing attachment members located at the ends of an elongated support member of the assist operationally configured to attach the assist to one or more target architectural surfaces such as planar surfaces (a) aligned substantially parallel to the floor or surface below the target surface, (b) aligned substantially perpendicular to the floor or surface below the target surface, (c) non-parallel and non-perpendicularly aligned to flooring below the target architectural surface. The assist is suitably operationally configured to be attached to architectural surface in a manner effective to fix the support member in a substantially horizontal orientation in relation to architectural flooring.

In another aspect, the application provides an installation assist that may be easily carried by hand and stored in a manner similar to other construction/carpentry tools and equipment.

In another aspect, the application provides an installation assist that may be installed in hallways of residential and/or commercial building structures by attaching the assist to side walls of the hallway and/or the ceiling of the hallway.

Figure 2:
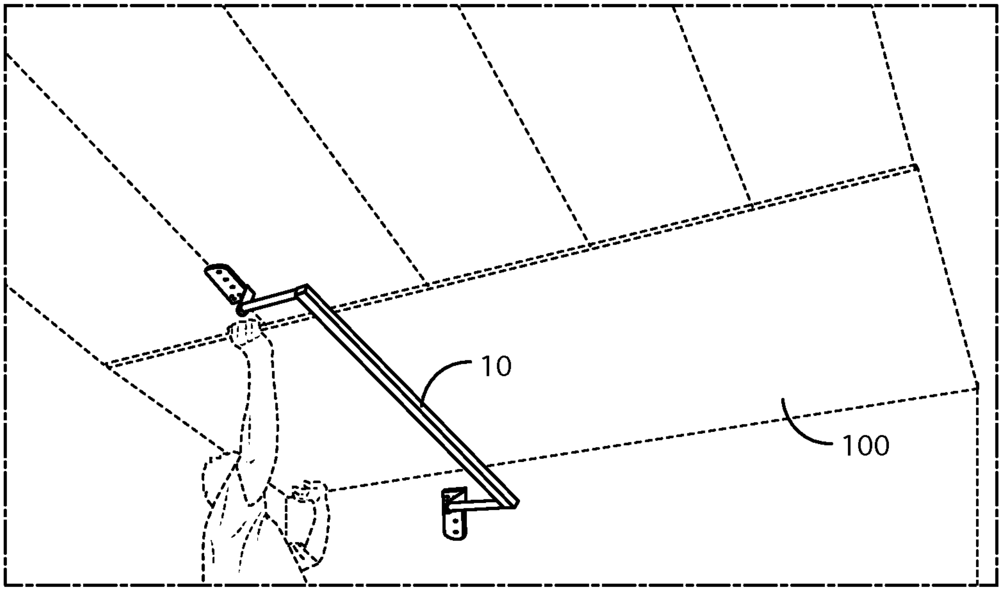
FIG. 2 is a simplified view of a single assist supporting a drywall panel during panel installation along a ceiling.

To better understand the novelty of the invention and method of use thereof, reference is hereafter made to the accompanying drawings. With reference now to FIG. 1, a first simplified embodiment of an installation assist 10 ("assist") is provided. As shown, the assist 10 includes an elongated support member 15 with mounting assemblies (11, 20 and 12, 30) disposed at each end of the support member 15. As discussed in detail below, a single assist 10 or multiple assists 10 may be attached to one or more surfaces via the attachment members 20, 30 in a manner effective to fix the assist(s) 10 in a set elevated position in a manner effective for the support member(s) 15 to aid in holding one or more materials atop the support member(s) 15 apart from the floor, ground or surface of the working area. For example, one or more assists 10 may be secured to architectural surface structures, e.g., rafters and/or joists and/or studs directly or via wall materials, insulation materials, etc., covering joists/studs in a manner effective to orient the support member 15 in a substantial horizontal arrangement (see FIGS. 2 and 3). Once the one or more assists 10 are set in place as desired, one or more individuals may direct a panel 100, e.g., drywall, atop the one or more support members 15 between the attachment members 20, 30 in a manner effective to suspend the panel 100 adjacent the joists where the panel 100 is to be installed (see FIGS. 2 and 3). Without limiting the invention, a suitable distance may be up to about 5.08 cm (2.0 inches) from the joists. Once one or more assists 10 are set at a suspended position, an individual can secure a section of the panel 100 to a joist as the assist 10 supports the remaining part of panel 100 in a substantially horizontal position, e.g., nail or screw a panel 100 to a joist.

With further reference to FIG. 1, a suitable support member 15 may be defined by a longitudinal axis and may be adjustable in length thereby adjusting the overall width between attachment members 20, 30 as desired. In the particular embodiment of FIG. 1, the support member 15 includes a two-part telescoping member operationally configured to alter the width between the attachment members 20, 30 from a (1) minimum width position as shown in FIG. 1 whereby a second part 17 of the support member 15 is fully retracted within a first part 16 of the support member 15 to a (2) maximum width with a desired length of the second part 17 extended out from the open end of the first part 16. In one embodiment, the support member 15 may be configured in a manner whereby a maximum width is defined by having most of the second part 17 extending out from the open end of the first part 16 with only a minimum length of the second part 17 effective for mating with the first part 16 to maintain the parts 16, 17 in a mated position during operation. As such, the maximum width of the support member 15 of FIG. 1 is slightly less than the sum of the length of the individual parts 16 and 17.

The assist 10 may be built to scale and is therefore not necessarily to a maximum/minimum width. In one particular embodiment, the assist 10 may include a maximum width sufficient to receive and support a 121.9 cm (48.0 inch) sheet of commercially available drywall on the support member 15. Depending on the configuration of the assist 10, a minimum width of the assist 10 may include a width down to one millimeter of space between support arms 11, 12. Suitably, the support member 15 may support a panel 100 or other construction material along the entire width of the panel 100 or other construction material in a manner effective to protect the same against sagging, sinking, or other physical distortion caused by gravity.

Still referring to FIG. 1, the first and second parts 16, 17 may be held or locked together in a fixed position via one or more fasteners as desired. In the embodiment of FIG. 1, the support member 15 includes a fastener in the form of a release pin assembly 18 for locking the telescoping parts 16, 17 together to provide a desired width between the attachment members 20, 30. As understood by the skilled artisan, the release pin assembly 18 may be provided as a knob and biased pin member operationally configured to mate with one of a plurality of locking apertures 22 (see FIG. 4) disposed along the second part 17. The location and number of locking apertures may vary according to a desired number of operable widths of the support member 15 desired. Also, the apertures 22 are suitably sized to accept the biased pin member in a slide-lock relationship. In another embodiment, a cotter pin, threaded knob pin, L-pin or T-pin may be used to hold or lock the first and second parts 16, 17 together.

Figure 5:
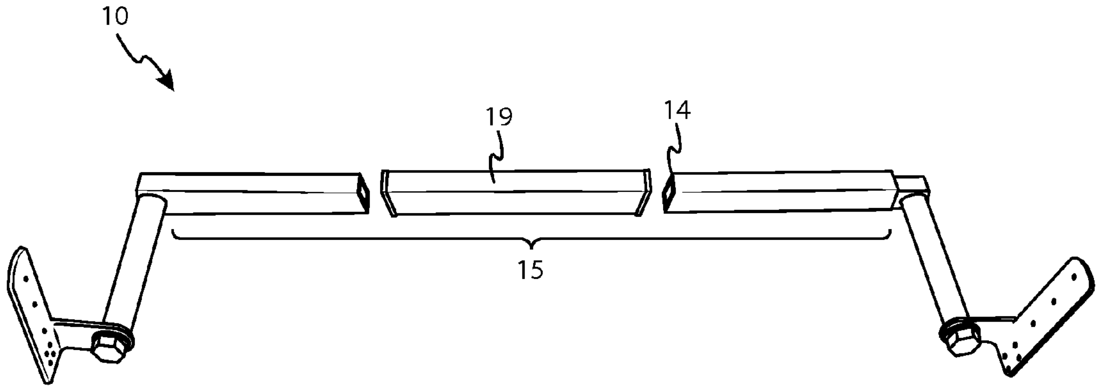
FIG. 5 is a perspective view of another embodiment of an assist of this application.

In another embodiment the support member 15 may be provided as a single structure providing a fixed width between the attachment members 20, 30. In another embodiment, the support member 15 may include one or more resilient members disposed along the length of the support member 15 providing a support member 15 whereby the attachment members 20, 30 may be pulled or otherwise forced apart to widen the support member 15 as desired, the attachment members 20, 30 retracting back to an original minimum width position once an applied force is removed from the attachment members 20, 30. One suitable resilient member employed may include a coiled spring. Another suitable resilient member employed may be made of a bungee material. In still another embodiment, the support member 15 may include one or more releasable joints 14 for joining one or more intermediary members 19 of various lengths to provide a desired length of the support member 15, i.e., a width of the assist 10 (see FIG. 5). In this embodiment, the individual parts or sections of the support member 15 may include various lengths as desired and be fastened together as desired, e.g., clamps, sleeves, releasable pins, and the like. One or more adhesives may be used for fastening purposes if desired. The support member 15 may be provided as a multi-sided member, e.g., four-sided square tubing as shown in FIG. 1. In another embodiment, the support member 15 may be provided as a tubular member 15. In another embodiment, the first part 16 may be provided as a square member and the corresponding second part 17 may be provided as a tubular member.

Figure 4:
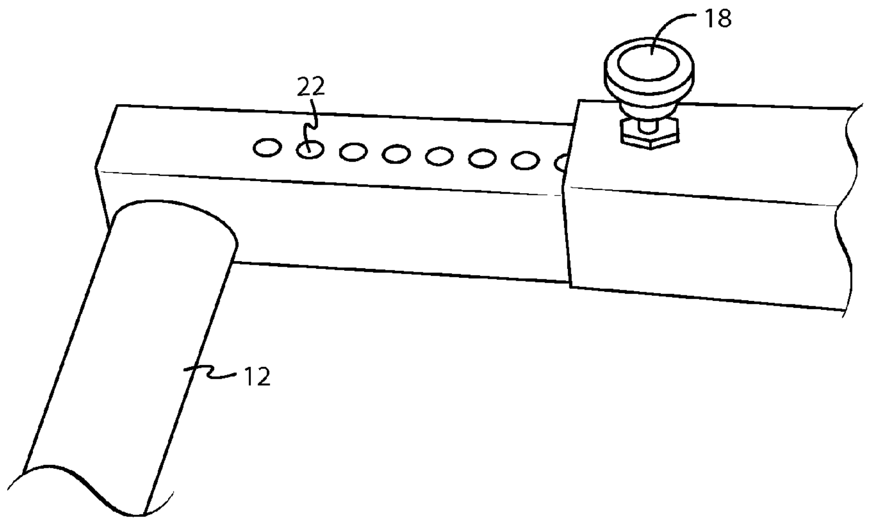
FIG. 4 is a simplified view of the locking mechanism of a particular embodiment of the assist.

In another embodiment, the support member 15 may include a support surface operationally configured to promote sliding of construction installation material(s) thereon. For example, the support member 15 may be provided with a plurality of rolling members disposed along the length of the support member 15 similar as described by U.S. Pat. Nos. 4,681,211 or 4,852,721, each of which is herein incorporated by reference. In another embodiment, the support member 15 may be provided as a fixed length roller shaft (or conveyor type roller) according to one or more configurations including, but not necessarily limited to U.S. Pat. No. 2,769,515 herein incorporated by reference. In another embodiment, a fixed length roller shaft may be included as one or more intermediary members 19 in an embodiment as illustrated in FIG. 4. In still another embodiment, the support member 15 may include one or more wheels disposed along the length of the support member 15 operationally configured to promote sliding of construction installation material(s). In still another embodiment, the outer surface or support surface of the support member 15 may include one or more outer surface coatings to promote sliding of construction installation material(s), e.g., polytetrafluoroethylene ("PTFE") coating.

Referring again to FIG. 1, the attachment members 20, 30 are suitably attached to the support member 15 via support arms 11, 12, which extend out from the first and second parts 16, 17 of the support member 15 as desired. As an example, each of the support arms 11, 12 suitably includes a length effective for offsetting the support member 15 apart from a joist or other architectural surface structure to be disposed between the attachment members 20, 30 and on to which a panel 100 or other construction material supported by the assist 10 is to be fastened. Such configuration allows for unhindered user operation, e.g., when using a hammer, screw driver, drill, and the like between the support arms 11, 12.

As shown, each of the support arms 11, 12 is provided as an elongated member defined by a longitudinal axis whereby the support arms 11 and 12 are attached to the distal ends of the first and second parts 16, 17 at about right angles. Because the second part 17 is smaller than the corresponding first part 16, the support arm 12 attached to the second part 17 may be provided as slightly longer than opposing support arm 11 so that the distal ends of the support arms 11, 12 extend out from the outer surface of the first part 16 a substantially equal distance. In another embodiment the distal ends of the support arms 11, 12 may extend out from the outer surface of the first part 16 at unequal distances.

Without limiting the invention, suitable support arms 11, 12 may extend out from the support member 15 from about 10.0 degrees to about 170.0 degrees. In the embodiment of FIG. 1, the support arms 11, 12 are set at a fixed position of about 90.0 degrees, i.e., 90.0 degrees between the longitudinal axis of the support member 15 and the longitudinal axis of each of the support arms 11, 12. In another embodiment, the support arms 11, 12 may be hingedly attached to the support member 15 whereby the support arms 11, 12 may be adjusted to change the angle formed between the each of the support arms 11, 12 and the support member 15. In another embodiment where the support arms 11, 12 are constructed from one or more resilient materials, the support arms 11, 12 may be bent for use and there after return to their original position in relation to the support member 15.

As shown, the support arms 11, 12 may be provided as tubular members. In another embodiment, the support arms 11, 12 may be provided as multi-sided members, e.g., square tubing. Although the length of the support arms 11, 12 are not necessarily limited to a particular length or range of lengths, for construction type applications the longest support arm may include a length up to about 30.48 cm (about 12.0). In addition, the support arms 11, 12 may include an outer width or diameter greater than, equal or less than the corresponding support member 15.

Figure 6:
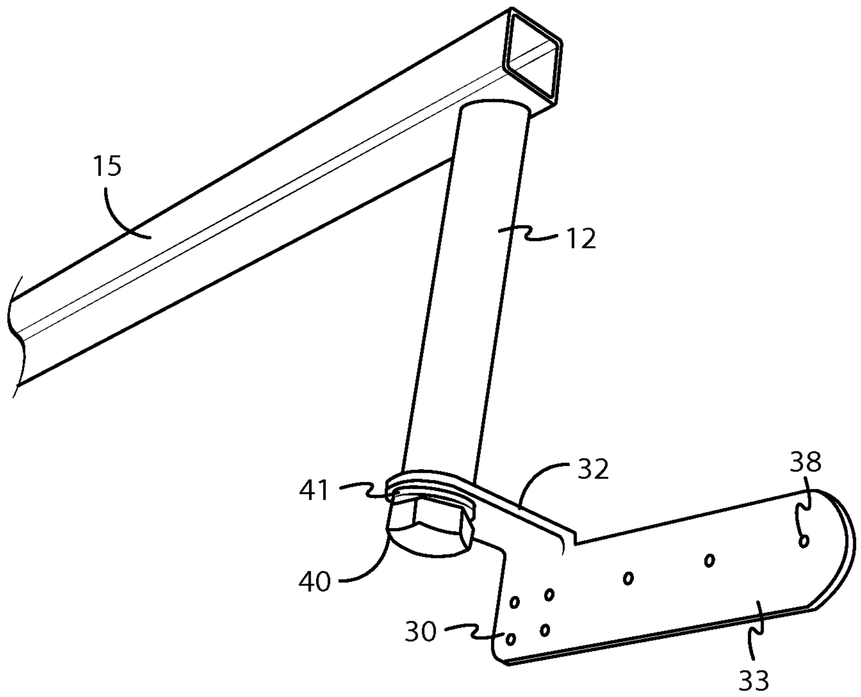
FIG. 6 is a simplified view of an assist support member, support arm and attachment member attached thereto.
Figure 7:
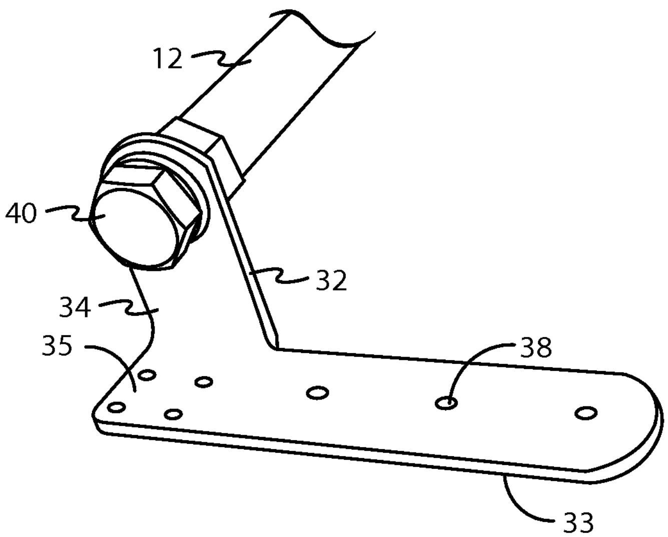
FIG. 7 is another simplified view of an assist support arm and attachment member attached thereto.

Turning to FIGS. 6 and 7, one suitable attachment member 30 may be rotatably attached at the distal end of a corresponding support arm 12 allowing for rotation of the attachment member about the arm 12 up to 360.0 degrees clockwise and counterclockwise. As shown, a suitable attachment member 30 may include an L-bracket type member or the like including an arm 32 attachable to the support arm 12 and a foot 33 extending angularly from the arm 32 and attachable to one or more support structures or surfaces via one or more fasteners through one or more apertures 38. In another embodiment, the attachment members 20, 30 may be provided as clamps, e.g., for attachment to angle iron and the like. In still another embodiment, the attachment members 20, 30 may be provided as suction cups. In still another embodiment, the attachment members 20, 30 may be provided as hooks. In still another embodiment, the attachment members 20, 30 may one or more spikes and/or threaded screws.

In the embodiment of FIGS. 6 and 7, the arm 32 suitably includes an aperture for receiving a pivot bolt 40 there through, the pivot bolt 40 securing the attachment member 30 to the support arm 12 as understood by persons of ordinary skill in the art. As further understood by the skilled artisan, the connection between the arm 12 and the attachment member 30 may also employ one or more washers 41 or the like to facilitate rotating action of the attachment member 30 about the support arm 12 as desired. In another embodiment, the assist 10 may include lock screw tightening adjusting knobs operationally configured to fix the attachment members 20, 30 in a fixed orientation about the support arms 11, 12.

Figure 8:
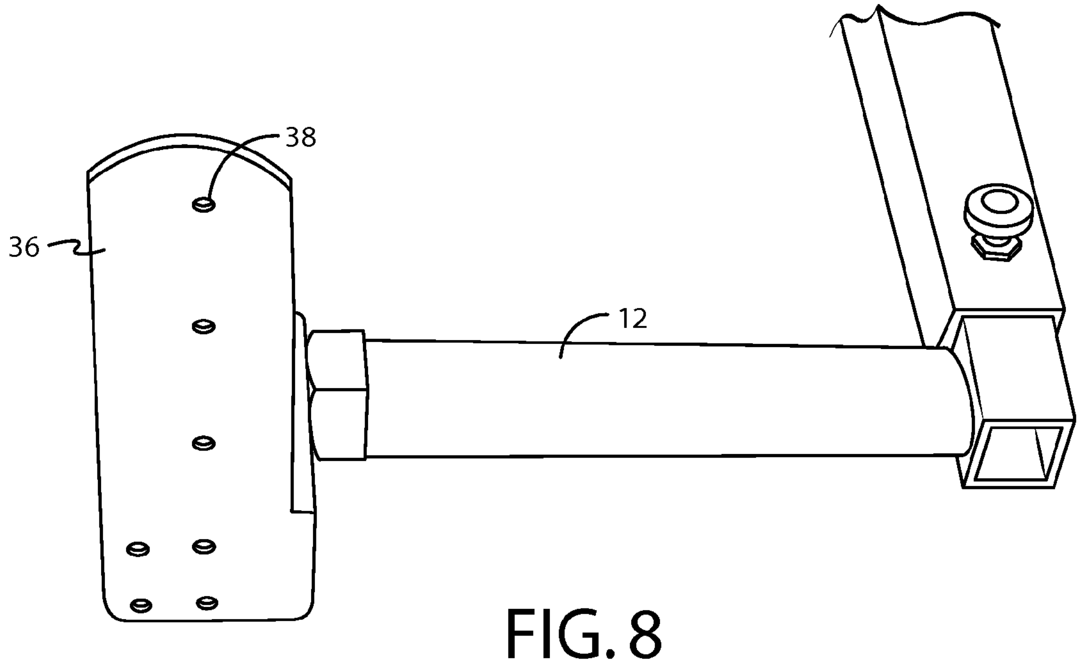
FIG. 8 is another simplified view of an assist support member, support arm and attachment member attached thereto.

Still referring to FIGS. 6 and 7, the arm 32 may include a planar member operationally configured to extend out from the distal end of the support arm 12 at about 90.0 degrees relative to the longitudinal axis of the support arm 12. In another embodiment, a majority of the arm 32 may extend out from the support arm 12 more or less than 90.0 degrees where the arm 32 is bent or curved at a point out just beyond its pivot bolt 40 receiving aperture. As shown, the foot 33 may include a planar member forming an angle with the arm 32 of about 90.0 degrees. As shown, the foot 33 suitably includes a first surface 35 forming an angle of about 90.0 degrees with a first surface 34 of the arm 32. As previously mentioned, the foot 33 suitably includes one or more apertures 38 for receiving fasteners there through for securing the assist 10 to one or more support structures or surfaces. As understood by persons of ordinary skill in the art of construction, suitable fasteners may include, but are not necessarily limited to nails, staples, pins, rivets, screws, anchors, clasps, bolts, and combinations thereof. Without limiting the foot 33 to a particular configuration, a suitable foot 33 includes a second surface 36 or mating surface (see FIG. 8) operationally configured to abut an architectural surface structure in a manner effective to set the assist 10 in a fixed position during assist 10 operation. In one embodiment, the second surface 36 may be provided as a planar surface as shown in FIG. 8 for abutting a substantially flat support structure or surface. According to the rotatable attachment of the first and second attachment members 20, 30, in the embodiment as shown in FIG. 1, the second surface 36 may be disposed planarly perpendicular, planarly parallel or neither planarly perpendicular or planarly parallel in relation to the longitudinal axis of the support member 15.

In another embodiment, the second surface 36 may be provided as a non-planar surface effective to correspond to one or more particular shaped support structures or surfaces, e.g., a curved second surface 36 corresponding to a circular beam or post. In another embodiment, the foot 33 may be provided as a flexible member for configuring in shape to the shape of one or more particular support structures or surfaces for abutment thereto. As shown, the foot 33 may also include rounded corners to prevent injury.

Figure 9:
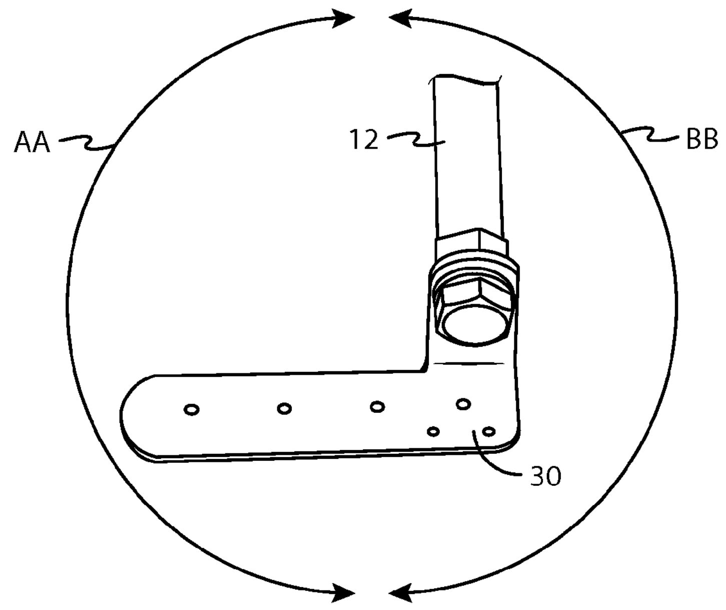
FIG. 9 is another simplified view of an assist support arm and attachment member.
Figure 10:
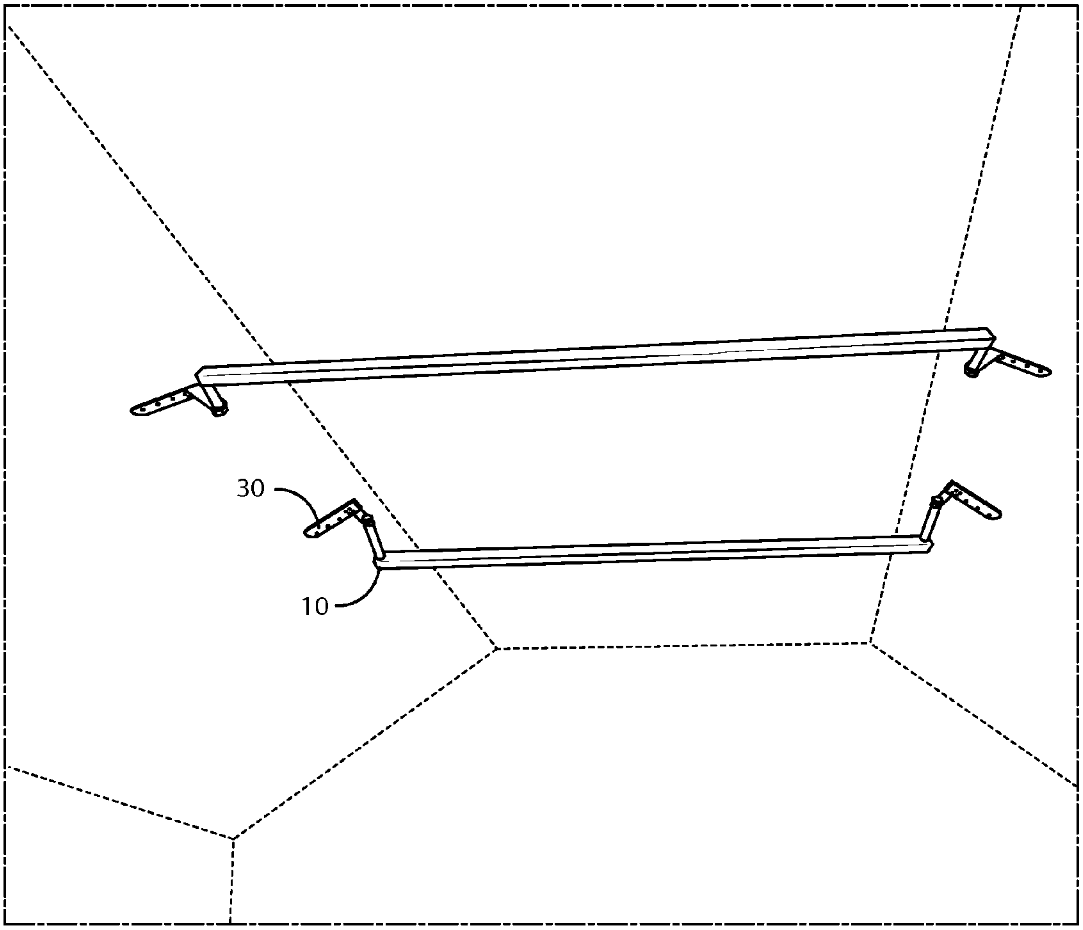
FIG. 10 is a simplified view of assists attached to angled ceilings.

As stated above, the attachment member 30 may be rotatably attached to the support arm 12 allowing for rotation of the attachment member 30 about the arm 12 up to 360.0 degrees clockwise and counterclockwise (see Arrows AA and BB in FIG. 9). Accordingly, the assist 10 is operationally configured so that each of the attachment members 20, 30 may be rotated for attachment to a slanted or angled surface, i.e., a non-vertical or non-horizontal surface relative to a floor, ground or surface of the working area as shown in FIG. 10.

The assist 10 may be constructed from any material durable enough to for construction type applications. In particular, the assist 10 may be constructed from materials including but not necessarily limited to those materials resistant to chipping, cracking, excessive bending and reshaping as a result of ozone, weathering, heat, moisture, other outside mechanical and chemical influences, as well as various impacts and other loads placed on the assist 10. Likewise, the assist 10 may comprise any color or combination of colors, e.g., painted, or in the alternative, the assist 10 may be transparent and translucent depending on individual preferences and needs.

Suitable materials include, but are not necessarily limited to metals, plastics, rubbers, woods, fiberglass, plexiglass, filled composite materials, and combinations thereof. Suitable plastics include, but are not necessarily limited to vinyl polymers, polyvinyl chloride (PVC), and combinations thereof. Suitably metals include, but are not necessarily limited to aluminum, steel, titanium, and combinations thereof. In one suitable embodiment, the assist 10 may be constructed from PVC. In another suitable embodiment, the assist 10 may be constructed from vinyl polymer. In another suitable embodiment, the assist 10 may be constructed from aluminum. In another suitable embodiment, the assist 10 may be constructed from alloy steel. A metal assist 10 may also be plated and/or laminated as desired. An assist 10 may also be provided with an outer foam layer for protecting against injury, e.g., in the event that an assist 10 falls from a particular elevation.

The invention will be better understood with reference to the following non-limiting examples, which are illustrative only and not intended to limit the present invention to a particular embodiment.

EXAMPLE 1

Figure 3:
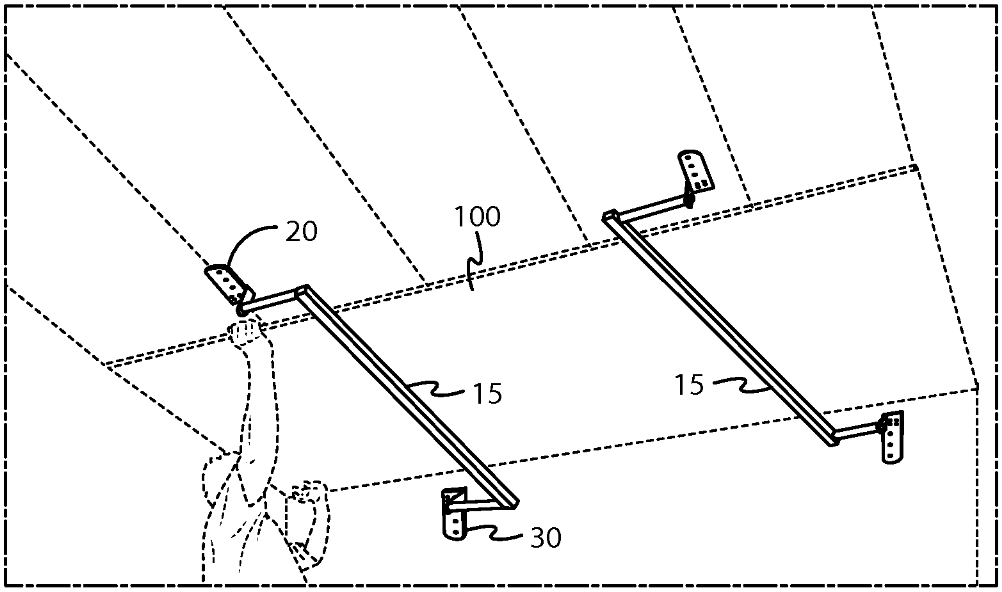
FIG. 3 is a simplified view of two assists supporting a drywall panel during panel installation along a ceiling.

With reference to FIG. 3, in a first non-limiting example for installing drywall panels to a ceiling, two assists 10 may be attached about 121.9 cm (about 48.0 inches) apart, i.e., two or three joists apart, as shown. Once the assists 10 are secured in place, a drywall panel 100 may be slide atop each of the assists 10 whereby the drywall panel 100 is supported at an elevated position for securement to the joists or other architectural support members. Once the panel 100 is installed, the assists 10 may be removed for reuse or storage.

EXAMPLE 2

In a second non-limiting example, a metal assist 10 as shown in FIG. 1 is provided including a minimum width of about 85.09 cm (33.5 inches) and a maximum width of about 152.4 cm (60.0 inches) may be provided with the following characteristics:

Support Member 15:
- First Part 16: Square tubing (3.18 cm by 3.18 cm); (1.25 inches by 1.25 inches);
- Second Part 17: Square tubing (0.318 cm by 0.318 cm); (0.125 inches by 0.125 inches);
  - The First and Second Parts 16, 17 having a wall thickness of about 0.48 cm (about 0.19 inches);

Mounting Assembly (two total):
- Arm 11, 12: Each arm has an outer diameter of about 1.27 cm (0.5 inches) and a length of about 15.24 cm (6.0 inches);
- Foot 33: Each foot 33 of the attachment members 20, 30 is constructed from sheet metal [2.54 cm by 15.24 cm; (1.0 inch by 6.0 inch)] with seven apertures 38 there through, each apertures 38 having an inner diameter of about 0.64 cm (0.25 inches). The attachment members 20, 30 are rotatably attached to the support arms 11, 12 and include a locking washer 41 with the following dimensions: 2.54 cm by 1.27 cm (1.0 inch by 0.5 inch).

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. An assist for installing construction materials apart from architectural flooring, including:

a support member defined by a longitudinal axis; and a mounting assembly attached at each end of the support member, each mounting assembly including an elongated arm defined by a longitudinal axis and an attachment member rotatably attached to each elongated arm, each elongated arm being fixed to the support member at 90.0 degrees relative the longitudinal axis of the support member and each attachment member being rotatably attached 360.0 degrees at a distal end of each elongated arm, each attachment member being operationally configured to be releasably attached to horizontal, vertical, and angled surfaces of architectural surface structures;

wherein each attachment member includes an L-bracket type member including an arm portion rotatably attached to an elongated arm and a foot portion; and wherein the foot portions include one or more apertures for receiving fasteners there through, each foot portion having a planar surface for abutting a substantially flat architectural surface structure.

2. The assist of claim 1 wherein the support member is adjustable in length.

3. The assist of claim 2 wherein the support member includes a two-part telescoping member.

4. The assist of claim 1 wherein the mounting assemblies are operationally configured to be attached to architectural surface structures in a manner effective to fix the support member in a substantially horizontal orientation in relation to said flooring.

5. The assist of claim 1 wherein the support member is operationally configured to receive one or more intermediary members of various lengths in attachment thereto.

6. A construction materials installation assist including:

a support member defined by a longitudinal axis, the support member being adjustable in length; and a mounting assembly attached at each end of the support member, each mounting assembly including an elongated arm defined by a longitudinal axis and an attachment member rotatably attached to each arm, each elongated arm being fixed to the support member at 90.0 degrees relative the longitudinal axis of the support member and each attachment member being rotatably attached 360.0 degrees at a distal end of each elongated arm, each attachment member being adjustable in a manner effective for securing an end of the assist to horizontal surfaces, vertical surfaces and angled surfaces;

wherein each attachment member includes an L-bracket type member including an arm portion rotatably attached to an elongated arm and a foot portion; and wherein the foot portions include one or more apertures for receiving fasteners there through, each foot portion having a planar surface for abutting a substantially flat architectural surface structure.

7. The assist of claim 6 wherein the length of the support member dictates the length of the assist.

8. The assist of claim 7 further including a fastener for fixing the support member at a particular length.

9. The assist of claim 6 wherein the elongated arms are cylindrical, each elongated arm having a distal end operationally configured to receive a bolt therein.

10. An assist for installing construction materials apart from architectural flooring, including:

a support member defined by a longitudinal axis; and a mounting assembly attached at each end of the support member, each mounting assembly including an elongated arm defined by a longitudinal axis and an attachment member rotatably attached to each arm, each elongated arm being fixed to the support member at 90.0 degrees relative the longitudinal axis of the support member and each attachment member being rotatably attached 360.0 degrees at a distal end of each elongated arm, each attachment member being operationally configured to be releasably attached to horizontal, vertical, and angled surfaces of architectural surface structures;

wherein each attachment member includes an L-bracket type member including an arm portion rotatably attached to an elongated arm and a foot portion; and wherein the arm portion includes a planar member including a first planar surface, the arm portion extending out from the elongated arm at 90.0 degrees relative to the longitudinal axis of the elongated arm, the foot portion including a first planar surface forming an angle of 90.0 degrees with a first planar surface of the arm portion.

* * * * *